(No Model.)

J. KELLY.
DEVICE FOR LAYING GUNS AT ANY ANGLE.

No. 426,593. Patented Apr. 29, 1890.

Witnesses
Thos. Houghton.
F. J. Arnold.

Inventor
James Kelly
By his Attorney
D. A. McKnight.

UNITED STATES PATENT OFFICE.

JAMES KELLY, OF SAN DIEGO, CALIFORNIA, ASSIGNOR OF ONE-HALF TO EDWARD DOUGHERTY, OF SAME PLACE.

DEVICE FOR LAYING GUNS AT ANY ANGLE.

SPECIFICATION forming part of Letters Patent No. 426,593, dated April 29, 1890.

Application filed August 5, 1889. Serial No. 319,716. (No model.)

*To all whom it may concern:*

Be it known that I, JAMES KELLY, a citizen of the United States, residing at San Diego, in the county of San Diego and State of California, have invented certain new and useful Improvements in Devices for Laying Guns at any Elevation; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1:
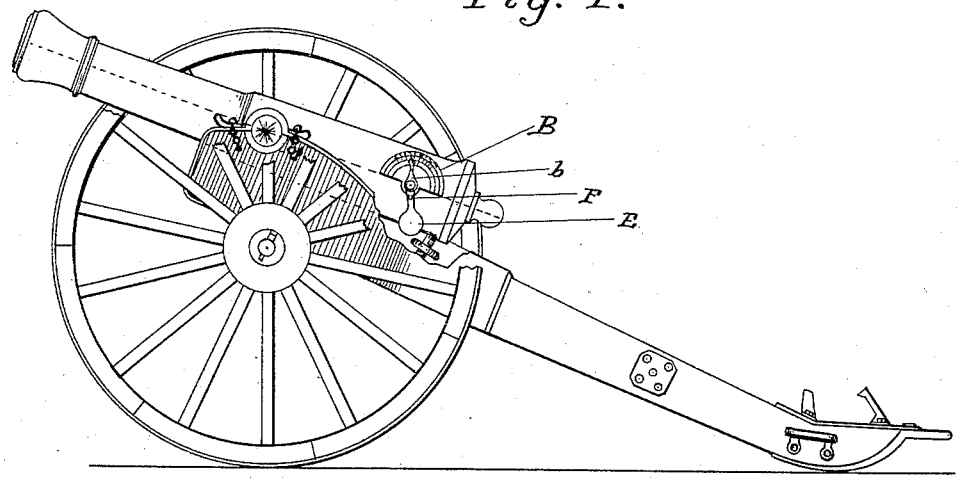
Figure 2:
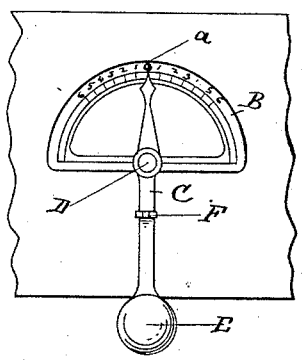
Figure 3:
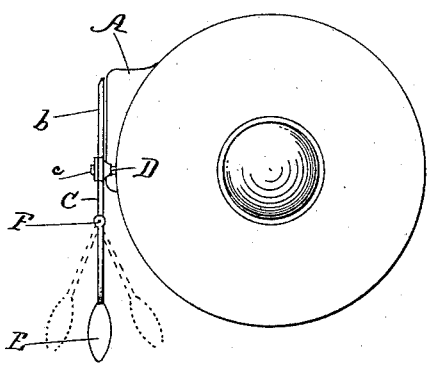

Figure 1 is a side elevation of a field-piece, (part of the near wheel being broken away,) showing my device attached thereto. Fig. 2 is an enlarged detail view of my invention. Fig. 3 is an enlarged rear end view of the gun with my device attached thereto.

My invention relates to ordnance, and is an improvement in devices for laying the gun at any elevation. Tangent scales in the breech of the gun, or a scale of degrees cut and numbered on the upper quarters of the base-ring in conjunction with a dispart-sight, and notches in the side of the muzzle, have been used to give the necessary elevation. The usual degrees of practice range from one-half to ten degrees.

The object of my invention is to provide a simple device by means of which the gunner may be enabled to lay the gun properly, whether upon a level plain or a hillside inclining to the right or to the left.

My invention consists of a circular bracket A, either cast upon the gun or made separately and secured thereto by screws in the usual manner. Said bracket A is of semicircular shape, and its diameter or base line is set in line with the center of the bore of the gun or parallel thereto. On the face of the bracket A is rigidly secured a semicircular scale B, its zero-point being a prime vertical when the axis of the bore of the gun is in a horizontal plane. From the zero-point the degrees are marked off and numbered each way consecutively as far as required. Ten degrees each side of zero will usually be sufficient.

Pivotally secured in the center of the scale B is a jointed index or pointer C, constructed of two portions—an upper or pointer portion *b* and a lower hinged portion provided with a pendulum-weight E.

F is the hinge connecting together the two parts of the pendulous pointer.

D is the pivot on which the pointer is held in position.

*c* is a screw passing through pointer C into its pivot D.

The scale B may be placed above or below the axis of the bore of the piece, the essential condition of the accuracy of its readings being that its zero-point shall be at right angles to the axis of the bore of the gun.

The hinge F or its equivalent is so placed that the lower part of the rod shall have a second plane of oscillation at right angles to its plane of oscillation on the pivot D, and it is readily seen, as shown by dotted lines in Fig. 3, that on a hillside the lower weighted portion will incline to the right or to the left in such a manner as to relieve the pivot D of undue friction, and thus add to the accuracy of the device.

I am aware that a pendulous pointer supported upon pivots at right angles to each other has been used for a similar purpose. Therefore I lay no claim to any such construction.

What I claim as new, and desire to secure by Letters Patent, is—

The combination, with a field-gun or other piece of ordnance, of a fixed circular scale numbered from zero each way, and a hinged pointer-rod secured to the gun by a pivot, substantially as and for the purpose herein set forth.

In testimony whereof I affix my signature in presence of two witnesses.

JAMES KELLY.

Witnesses:
ANDREW CASSIDY,
H. H. DEVOLL.